July 31, 1945.  J. B. McMAHON  2,380,858
CONTROL APPARATUS
Filed April 14, 1943
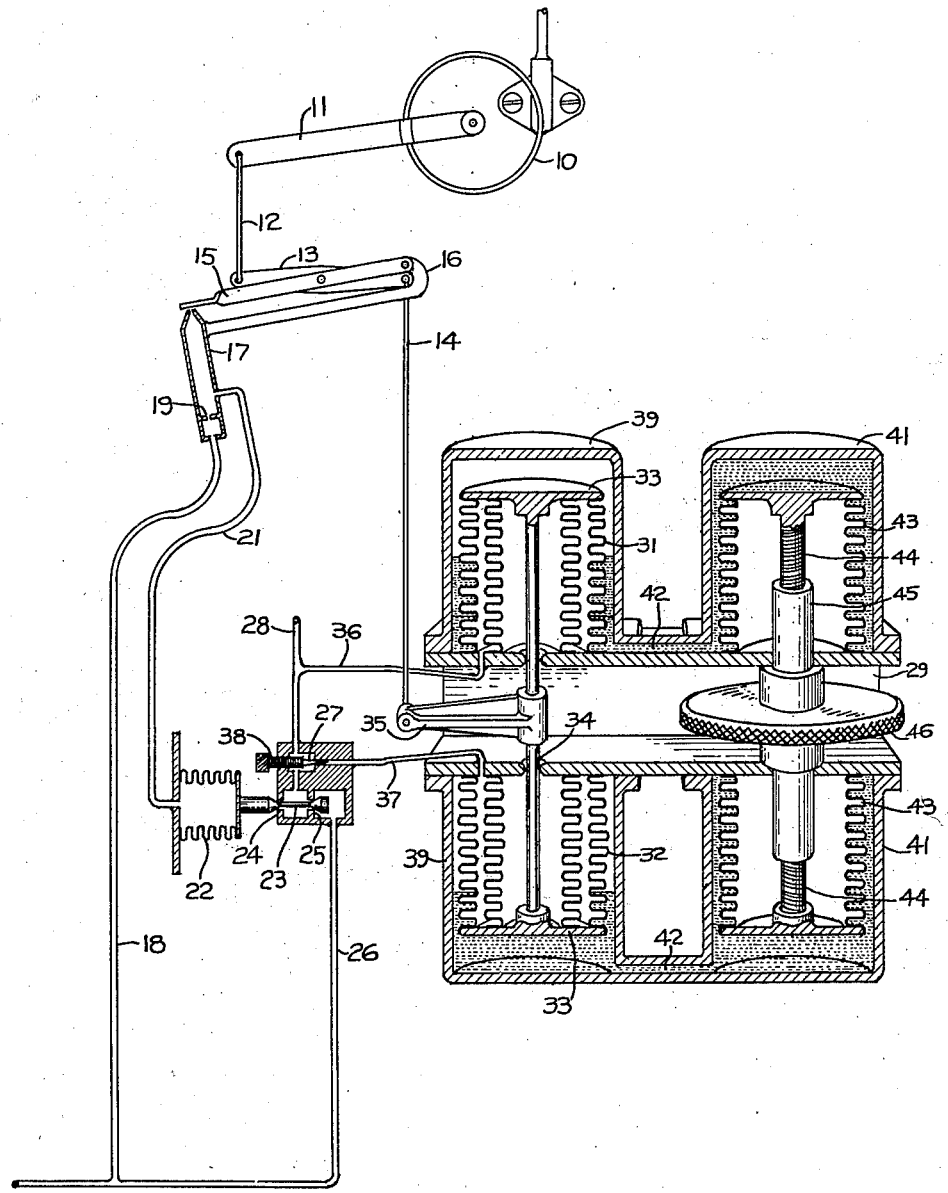
Inventor
Jerome B. McMahon
by Lawson Ooms & Booth
Attorneys Patented July 31, 1945

2,380,858

UNITED STATES PATENT OFFICE 2,380,858

CONTROL APPARATUS

Jerome B. McMahon, Wilmette, Ill., assignor to Republic Flow Meters Company, Chicago, Ill., a corporation of Illinois Application April 14, 1943, Serial No. 483,083

14 Claims. (Cl. 137—153)

This invention relates to control apparatus and more particularly to apparatus responsive to fluctuations in a condition to produce a control force which may be utilized to return the condition to its normal value.

One of the objects of the invention is to provide control apparatus whose operating range can be easily and quickly adjusted.

Another object of the invention is to provide control apparatus in which adjustment of the operating range does not affect the zero or set point.

Still another object of the invention is to provide control apparatus in which re-setting movement is opposed by a fluid spring. According to one of the features of the invention the spring may be adjusted by varying the effective fluid volume.

The above and other objects and advantages of the invention will be more readily apparent from the following description when read in connection with the accompanying drawing, in which the single figure is a diagrammatic view with parts in section of one form of apparatus embodying the invention.

Apparatus of this character is normally employed to control the temperature, pressure, rate of flow, or some other similar condition to maintain it at a substantially constant normal value. The particular apparatus illustrated may be employed to control any such condition and includes an element 10 shown as a Bourdon tube responsive to the condition. The control element 10 moves a lever 11 which is connected through a link 12 to one end of a floating lever 13. The opposite end of the lever 13 is connected to a link 14 and its center point is pivoted to a flapper 15 pivoted at one end on a fixed bracket 16 and cooperating at its other end with a nozzle 17 carried by the bracket 16. The flapper and nozzle form a control couple for varying the pressure in the nozzle, as is well understood in the art.

The nozzle is supplied with fluid, such as air under pressure, from a pipe 18 through a restricted orifice 19 and the pressure between the orifice and nozzle is conducted through a pipe 21 to an expansible bellows 22. The bellows 22 forms a part of a pressure relay mechanism and operates a double ended valve 23 controlling opposed ports 24 and 25 in a valve block. Fluid under pressure is supplied to the port 25 through a pipe 26 which may communicate with the same pressure source as the pipe 18. Fluid pressure as produced by the pressure relay is conducted into a chamber 27 in the valve which may be connected through a pipe 28 to control instrumentality such, for example, as a pressure operated valve to regulate the condition.

In order to compensate or to re-set the control couple to prevent over control and hunting, there is provided according to the present invention a pressure responsive means connected to the control couple to re-adjust it prior to bringing the condition back to its normal value. As shown, this means comprises a channel shaped frame 29 upon which is mounted a pair of doubled wall bellows 31 and 32 with their inner ends connected to the frame in axial alignment. The outer ends of the bellows are closed by plates 33 and are connected through a rod or link 34 which carries a bracket 35 connected to the link 14. The space between the walls of the bellows 31 is connected without substantial restriction to the chamber 27 through a pipe 36 and the space between the walls of the bellows 32 is connected to the chamber 27 through a pipe 37 which is variably restricted by an adjustable valve 38. The bellows are enclosed by housings or casings 39 which form closed chambers around the bellows respectively.

In operation the chambers in the housings 39 may be evacuated to any desired extent or may be filled with a gas at any desired pressure, the pressures in both chambers being equal. Preferably, both chambers are partially evacuated to such an extent that the pressure in neither one will rise above atmospheric during operation.

In operation of the mechanism as so far described, a change in the condition to move the lever 11 counter-clockwise will cause the lever 13 to pivot around the upper end of the link 14 and will move the flapper 15 toward the nozzle 17. This will increase the pressure back of the nozzle operating the relay to increase the pressure in pipe 28 thereby to effect operation of the control instrumentality to bring the condition back to normal value. At the same time, the increased pressure in pipe 28 will be transmitted through pipe 36 to the bellows 31 to expand it thereby raising the bracket 35 and link 14. At this time the lever 13 will move about its left end as a pivot to raise the flapper 15 to its original position and to restore the pressure in the nozzle and relay mechanism.

At the same time pressure will be transmitted through the pipe 37 past valve 38 at a slower rate into the bellows 32 gradually to expand it. Finally, the pressure in bellows 31 and 32 will be equalized so that the compensating force produced by bellows 31 will be cancelled and the flapper 15 will again be under the sole control of the sensitive element 10. If the instrument is properly adjusted the condition will by this time have returned to its normal value and the apparatus will remain stationary.

Expansion of the bellows in response to a variation in the control pressure will be opposed by changes in volume of the space within the housings 39, which space forms in effect a fluid spring. It will be noted that an upward movement of the bellows decreases the space in the upper chamber to increase the pressure therein and simultaneously increases the space in the lower chamber to decrease the pressure therein and that such upward movement is opposed by the sum of these two forces.

In order to vary the operating or throttling range of the apparatus, the effective volume of the two chambers forming the air spring may be varied and if this variation is equal in both chambers the zero or set point of the apparatus will not be changed. In order to accomplish this there is provided according to the present invention a second pair of housings 41 connected respectively through passages 42 with the lower parts of the housings 39. An expansible bellows 43 is secured to the frame 29 and projects into each of the housings 41. Expansion of the bellows may be controlled by screws 44 of opposite hand connected to the ends of the bellows rerespectively and threaded into the ends of a sleeve 45 which may be turned through a hand wheel 46. The space within the housings 41 around the bellows is filled with a liquid and operation of the hand wheel will cause variable amounts of this liquid to be forced into the housings 39 to vary the effective volume thereof.

It will be noted that the bellows 43 are of the same size so that operation of the hand wheel will cause equal movement of each bellows and consequently will displace equal amounts of liquid into the housings 39. Therefore, when the hand wheel is operated, the variation of effective volume in the housings 39 will be the same so that the balance of the instrument will not be disturbed and its set point will remain constant. However, since the effective volume is changed, the resistance to motion offered by the fluid spring will be altered to change the operating or throttling range of the apparatus. In other words, when the volume is smaller a given change of pressure will produce a smaller degree of movement than when the volume is larger.

While one embodiment of the invention has been shown and described, it will be understood that this is illustrative only and is not intended as a definition of the scope of the invention, reference being had for this purpose to the appended claims.

What is claimed is:

1. Control apparatus comprising means responsive to variations in a condition for producing a pressure proportional to a function of the condition, a pressure responsive member responsive to said pressure to be moved thereby and connected to said means to move it, means forming a closed chamber containing a compressible fluid whose volume is varied by movement of said member, and means to force a variable quantity of liquid into said chamber to vary its effective volume.

2. Control apparatus comprising means responsive to variations in a condition for producing a pressure proportional to a function of the condition, a pressure responsive member responsive to said pressure to be moved thereby and connected to said means to move it, housing means inclosing one side of said member and containing a compressible fluid, and adjustable means to vary the effective volume of the housing means.

3. Control apparatus comprising means responsive to variations in a condition for producing a pressure proportional to a function of the condition, a pressure responsive member responsive to said pressure to be moved thereby and connected to said means to move it, housing means inclosing one side of said member containing a compressible fluid, and means to force a variable quantity of liquid into the housing means to vary its effective volume.

4. Control apparatus comprising means responsive to variations in a condition to produce a pressure proportional to a function of the condition, a pair of opposed pressure responsive members connected together and to said means to adjust it, one of said members being connected directly to said means to receive pressure therefrom, means forming a restricted orifice connecting the other of said members to said means for flow of pressure therebetween, means forming a closed expansible chamber connected to said members and containing a compressible fluid the volume of which is varied as the members move, and adjustable means to vary the effective volume of the expansible chamber.

5. Control apparatus comprising means responsive to variations in a condition to produce a pressure proportional to a function of the condition, a pair of opposed pressure responsive members connected together and to said means to adjust it, one of said members being connected directly to said means to receive pressure therefrom, means forming a restricted orifice connecting the other of said members to said means for flow of pressure therebetween, a housing inclosing one side of one of the members to form a closed chamber containing a compressible fluid whose volume is varied as the member moves, and adjustable means to vary the effective volume of the housing.

6. Control apparatus comprising means responsive to variations in a condition to produce a pressure proportional to a function of the condition, a pair of opposed pressure responsive members connected together and to said means to adjust it, one of said members being connected directly to said means to receive pressure therefrom, means forming a restricted orifice connecting the other of said members to said means for flow of pressure therebetween, housings inclosing one side of each of said members to form a pair of inclosed chambers whose volumes vary as the members move, and means simultaneously to adjust the volumes of said housings.

7. Control apparatus comprising means responsive to variations in a condition to produce a pressure proportional to a function of the condition, a pair of opposed pressure responsive members connected together and to said means to adjust it, one of said members being connected directly to said means to receive pressure therefrom, means forming a restricted orifice connecting the other of said members to said means for flow of pressure therebetween, housings inclosing one side of each of said members to form a pair of inclosed chambers whose volumes vary as the members move, and adjustable means simultaneously to supply liquid to the housings to vary the effective volumes of the chambers.

8. Control apparatus comprising means responsive to a condition to produce a pressure proportional to a function of the condition, an expansible bellows connected to the means to adjust it as the bellows moves, means connecting one side of the bellows to the means to receive pressure therefrom, a housing inclosing the other side of the bellows and containing a compressible fluid, and means for adjusting the effective volume of the housing.

9. Control apparatus comprising means responsive to a condition to produce a pressure proportional to a function of the condition, an expansible bellows connected to the means to adjust it as the bellows moves, means connecting one side of the bellows to the means to receive pressure therefrom, a housing inclosing the other side of the bellows and containing a compressible fluid, and means for supplying a variable quantity of liquid to the housing to vary its effective volume.

10. Control apparatus comprising means responsive to a condition to produce a pressure proportional to a function of the condition, a pair of alined expansible bellows, means connecting the bellows to move together and to the means to adjust it, connections from the means to one side of each bellows to conduct pressure thereto, means forming a restriction in one of the connections, housings inclosing the other sides of the bellows to form closed chambers, and adjustable means simultaneously to vary the volumes of the chambers.

11. Control apparatus comprising means responsive to a condition to produce a pressure proportional to a function of the condition, a pair of alined expansible bellows, means connecting the bellows to move together and to the means to adjust it, connections from the means to one side of each bellows to conduct pressure thereto, means forming a restriction in one of the connections, housings inclosing the other sides of the bellows to form closed chambers, and means simultaneously to supply liquid to the housings to vary the effective volume of the chambers.

12. Control apparatus comprising means responsive to a condition to produce a pressure proportional to a function of the condition, a pair of alined expansible bellows, means connecting the bellows to move together and to the means to adjust it, connections from the means to one side of each bellows to conduct pressure thereto, means forming a restriction in one of the connections, housings inclosing the other sides of the bellows to form closed chambers containing a compressible fluid, a pair of liquid filled expansible chambers communicating with the housings respectively, and means simultaneously to adjust the volumes of the expansible chambers.

13. Control apparatus comprising means responsive to a condition to produce a pressure proportional to a function of the condition, a pair of alined expansible bellows, means connecting the bellows to move together and to the means to adjust it, connections from the means to one side of each bellows to conduct pressure thereto, means forming a restriction in one of the connections, housings inclosing the other sides of the bellows to form closed chambers containing a compressible fluid, a pair of housings connected to the first named housings respectively and adapted to contain liquid, a pair of expansible bellows sealed in the last named housings respectively, and means for simultaneously moving the last named bellows.

14. Control apparatus comprising means responsive to a condition to produce a pressure proportional to a function of the condition, a pair of alined double walled bellows mounted with their adjacent ends fixed, a rod connecting the outer ends of the bellows, means connecting the rod to said means to adjust it as the bellows move, connections from the means to the space between the walls of the bellows to supply pressure thereto, a restriction in one of the connections, housings inclosing the bellows to form closed chambers, and adjustable means to vary the volumes of the housings.

JEROME B. McMAHON.